US012327882B2

(12) United States Patent
Lee et al.

(10) Patent No.: US 12,327,882 B2
(45) Date of Patent: Jun. 10, 2025

(54) BATTERY MODULE AND BATTERY PACK INCLUDING THE SAME

(71) Applicant: LG Energy Solution, Ltd., Seoul (KR)

(72) Inventors: Changhun Lee, Daejeon (KR); Junyeob Seong, Daejeon (KR); Myungki Park, Daejeon (KR); Jonghwa Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 769 days.

(21) Appl. No.: 17/612,842

(22) PCT Filed: Feb. 23, 2021

(86) PCT No.: PCT/KR2021/002256
§ 371 (c)(1),
(2) Date: Nov. 19, 2021

(87) PCT Pub. No.: WO2021/221284
PCT Pub. Date: Nov. 4, 2021

(65) Prior Publication Data
US 2022/0238964 A1    Jul. 28, 2022

(30) Foreign Application Priority Data
Apr. 27, 2020    (KR) .................. 10-2020-0050725

(51) Int. Cl.
*H01M 50/503*    (2021.01)
*H01M 50/505*    (2021.01)

(52) U.S. Cl.
CPC ....... *H01M 50/503* (2021.01); *H01M 50/505* (2021.01)

(58) Field of Classification Search
CPC ....... H01M 50/20–507; H01M 50/503; H01M 50/505
See application file for complete search history.

(56) References Cited

U.S. PATENT DOCUMENTS 10,177,353 B2    1/2019    Kim et al.
2010/0141214 A1    6/2010    Yoon et al.
(Continued)

FOREIGN PATENT DOCUMENTS

CN    106953135 A    7/2017
CN    107112485 A    8/2017
(Continued)

OTHER PUBLICATIONS

Cui et al., CN209447871U EPO machine translation, 2019 (Year: 2019).*

(Continued)

*Primary Examiner* — Haroon S. Sheikh
*Assistant Examiner* — Kan Luo
(74) *Attorney, Agent, or Firm* — Lerner David LLP

(57) ABSTRACT

A battery module includes a battery cell stack in which a plurality of battery cells are stacked, and a busbar frame located on a front surface or a rear surfaces of the battery cell stack, the busbar frame includes a support part surrounding at least a portion of a bottom surface of the battery cell stack, and the support part includes an extension region extending from the busbar frame in a lengthwise direction of a battery cell of the plurality of battery cells, and a protrusion region on the extension region.

10 Claims, 8 Drawing Sheets

(56) References Cited

U.S. PATENT DOCUMENTS

| | | |
|---|---|---|
| 2015/0064541 A1 | 3/2015 | Noh et al. |
| 2016/0126531 A1* | 5/2016 | Kim et al. ............ H01M 2/30 |
| 2017/0331097 A1 | 11/2017 | Lee et al. |
| 2018/0175464 A1 | 6/2018 | Kim et al. |
| 2019/0044119 A1 | 2/2019 | Fernandez-Galindo et al. |
| 2019/0123334 A1 | 4/2019 | Kataoka et al. |
| 2019/0260099 A1 | 8/2019 | Ju et al. |
| 2020/0112014 A1 | 4/2020 | Kim et al. |
| 2020/0144580 A1 | 5/2020 | Hong et al. |
| 2020/0259158 A1 | 8/2020 | Motohashi et al. |
| 2020/0411924 A1 | 12/2020 | Yun |
| 2021/0175559 A1 | 6/2021 | Choi et al. |
| 2021/0194101 A1 | 6/2021 | Kim et al. |
| 2021/0226291 A1 | 7/2021 | Kim et al. |

FOREIGN PATENT DOCUMENTS

| | | | |
|---|---|---|---|
| CN | 109417149 A | | 3/2019 |
| CN | 109742285 A | | 5/2019 |
| CN | 110168799 A | | 8/2019 |
| CN | 209447871 U | * | 9/2019 ............ H01M 2/10 |
| CN | 110892552 A | | 3/2020 |
| CN | 110915024 A | | 3/2020 |
| CN | 111066173 A | | 4/2020 |
| CN | 111527622 A | | 8/2020 |
| EP | 3694017 A1 | | 8/2020 |
| JP | 2018529186 A | | 10/2018 |
| JP | 2019067676 A | | 4/2019 |
| JP | 2020-505723 A | | 2/2020 |
| KR | 20150024724 A | | 3/2015 |
| KR | 20160077765 A | | 7/2016 |
| KR | 20170050959 A | | 5/2017 |
| KR | 20180135701 A | | 12/2018 |
| KR | 20190107900 A | | 9/2019 |
| KR | 20190124022 A | | 11/2019 |

OTHER PUBLICATIONS

Search Report dated Feb. 22, 2023 from Office Action for Chinese Application No. 202180003613.9 issued Feb. 25, 2023. 3 pgs. (see p. 1-2).

International Search Report for Application No. PCT/KR2021/002256 mailed Jun. 2, 2021, pp. 1-3.

Extended European Search Report for Application No. 21797175.3 dated Jul. 11, 2022. 6 pgs.

* cited by examiner

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2021/002256, filed on Feb. 23, 2021, which claims the benefit of Korean Patent Application No. 10-2020-0050725 filed on Apr. 27, 2020 in the Korean Intellectual Property Office, the disclosures of which are incorporated herein by reference in their entireties.

TECHNICAL FIELD

The present disclosure relates to a battery module and a battery pack including the same, and more particularly to a battery module that improves a molding defect caused by the size increase of a component, and a battery pack including the same.

BACKGROUND ART

As technology development and demands for mobile devices increase, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle- or large-sized devices such as vehicles require high power and large capacity. A middle or large-sized battery module is preferably manufactured so as to have as small a size and weight as possible. For this reason, a prismatic battery, a pouch-type battery or the like, which can be stacked with high integration and has a small weight relative to capacity, is usually used as a battery cell of the middle or large-sized battery module. Therefore, a middle or large-sized battery module in which a large number of battery cells are electrically connected is used, and gradually, the need for installing many more battery cells within a battery module is increasing.

On the other hand, as the need for the battery module to include many more battery cells is increased, the size of the component included in the battery module also needs to be increased. However, among the components included in the battery module, the component formed by injection molding causes an unmolded section to occur as the size increases. Accordingly, in order to realize the size increase of the battery module, there is a need to improve a molding defect in the unmolded section.

DETAILED DESCRIPTION OF THE INVENTION

Technical Problem

It is an object of the present disclosure to provide a battery module that can improve a molding defect of a component caused by the size increase of the battery module, and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery module comprising a battery cell stack in which a plurality of battery cells are stacked, and a busbar frame located on a front surface or a rear surface of the battery cell stack, wherein the busbar frame comprises a support part surrounding at least a portion of a bottom surface of the battery cell stack, and wherein the support part comprises an extension region extending from the busbar frame in a lengthwise direction of a battery cell of the plurality of battery cells, and a protrusion region on the extension region.

The protrusion region may include at least two protrusion regions, with each protrusion region of the at least two protrusion regions being spaced apart from each other in a direction corresponding to a direction in which the plurality of battery cells are stacked.

The protrusion region may be at a location corresponding to where an unmolded section would be disposed in the support part.

The protrusion region may be at a location corresponding to a region between two of the plurality of battery cells in the battery cell stack.

The protrusion region may be protruded from the extension region toward the battery cell stack.

The protrusion region may have a symmetrical shape.

At least one layer of the protrusion region may be stacked on the extension region.

At least two layers of the protrusion region may be stacked on the extension region, with a length of a layer of the at least two layers adjacent to the extension region being longer than lengths of other layers of the at least two layers.

The length of the layer adjacent to the extension region may be identical to or smaller than a region between two of the plurality of battery cells in the battery cell stack.

A thickness of the extension region may be smaller than a thickness of a location of the support part at which the protrusion region is disposed.

According to one embodiment of the present disclosure, there is provided a battery pack comprising the above-mentioned battery module.

Advantageous Effects

According to the embodiments of the present disclosure, the molding defect caused when the busbar frame is injection-molded can be improved by reinforcing a thickness of a partial section of the busbar frame according to the size increase of the battery module.

Further, an application amount of the thermally conductive resin can be prevented from being increased due to an increase in the entire thickness, through a partial reinforcement of the thickness of the busbar frame.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
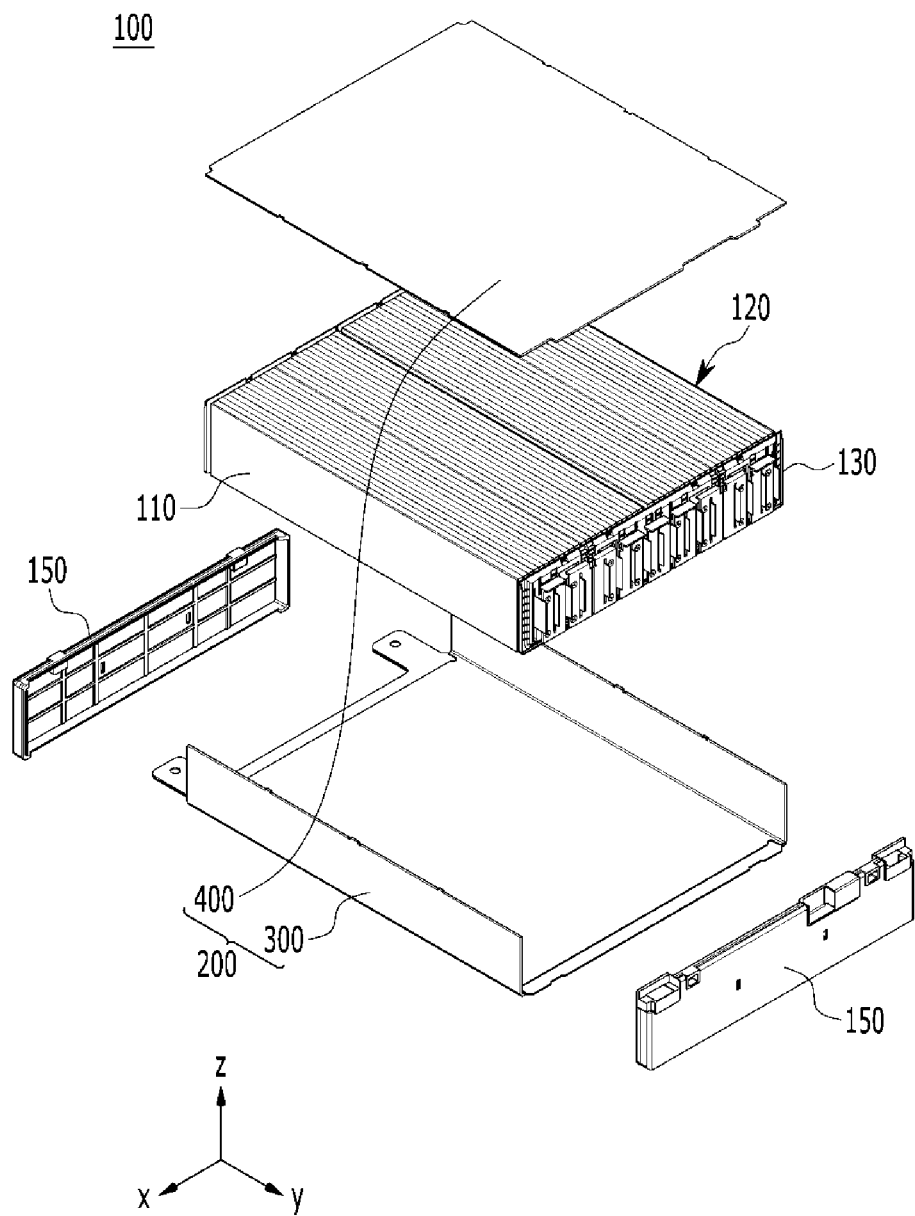
FIG. 1 is an exploded perspective view illustrating a battery module according to an embodiment of the present disclosure.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

In the following, an electrode for a secondary battery according to an embodiment of the present disclosure will be described. However, the description herein is made based on the front surface of the front and rear surfaces of the battery module, but is not necessarily limited thereto, and even in the case of the rear surface, the same or similar contents may be described.

Figure 2:
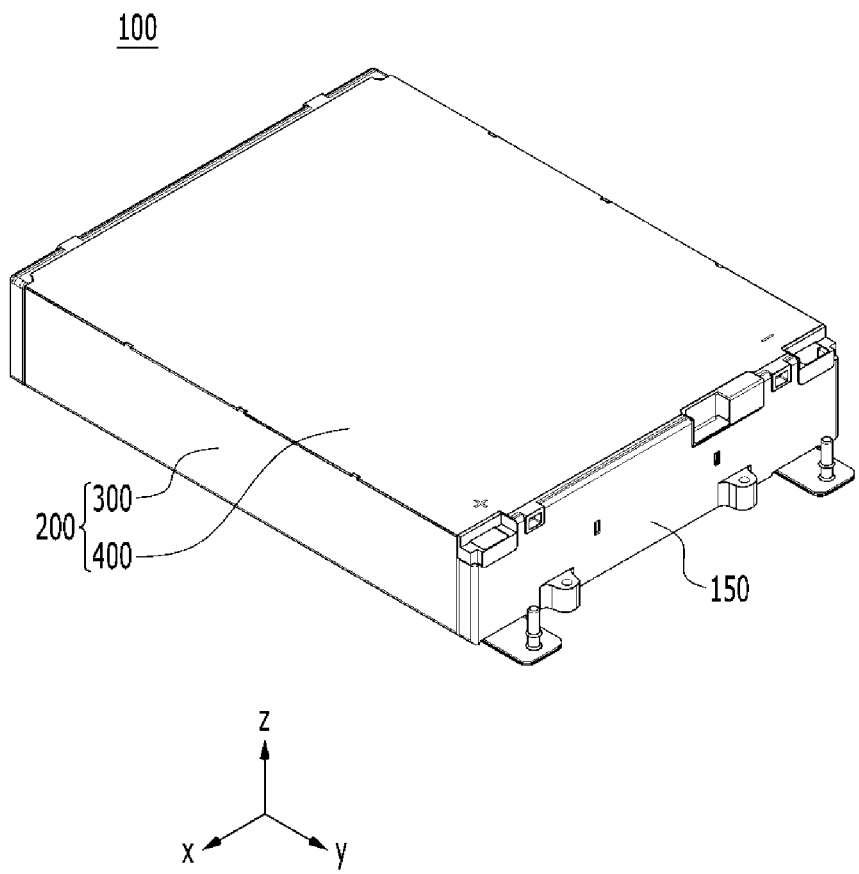
FIG. 2 is a perspective view illustrating a state in which elements constituting the battery module of FIG. 1 are coupled to each other.

FIG. 1 is an exploded perspective view illustrating a battery module according to an embodiment of the present disclosure. FIG. 2 is a perspective view illustrating a state in which elements constituting the battery module of FIG. 1 are coupled to each other.

Referring to FIGS. 1 and 2, a battery module 100 according to the present embodiment includes a battery cell stack 120 in which a plurality of the battery cells 110 are stacked, a module frame 200 for housing the battery cell stack 120, and end plates 150 for covering front and rear surfaces of the battery cell stack 120. Further, the battery module 100 further includes a busbar frame 130 located between the end plates 150 and the battery cell stack 120.

As an example, the module frame 200 includes a U-shaped frame 300, of which an upper surface, a front surface, and a rear surface are opened, and an upper plate 400 for covering an upper part of the battery cell stack 120. However, the module frame 200 is not limited thereto and may be replaced by a frame of another shape, such as an L-shaped frame or a mono frame surrounding the battery cell stack 120 excluding front and rear surfaces thereof.

The busbar frame 130 may include parts surrounding lower ends of the front and rear surfaces of the battery cell stack 120 stacked in parallel, thereby protecting the battery cell stack 120 from an external impact and improving the insulation performance of the battery cell stack 120.

However, the battery module 100 according to an embodiment of the present disclosure includes a large-area module in which the battery cell stack 120 includes a relatively larger number of battery cells as compared with the existing battery module. In the case of the large-area module, the horizontal length of the battery module becomes relatively longer. Here, the horizontal length of the battery module may mean a length in a direction in which the battery cells are stacked.

Hereinafter, the busbar frame 130 included in the battery module 100 according to an embodiment of the present disclosure will be described in detail in comparison with a comparative example.

Figure 3:
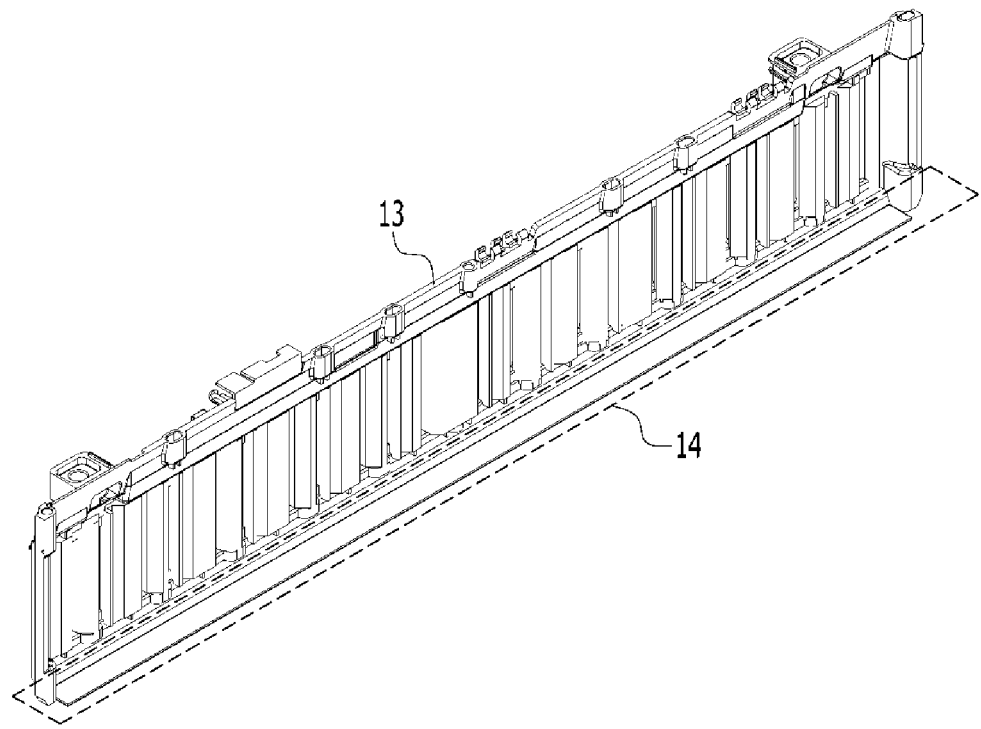
FIG. 3 is a view illustrating a busbar frame in a battery module according to a comparative example.
Figure 4:
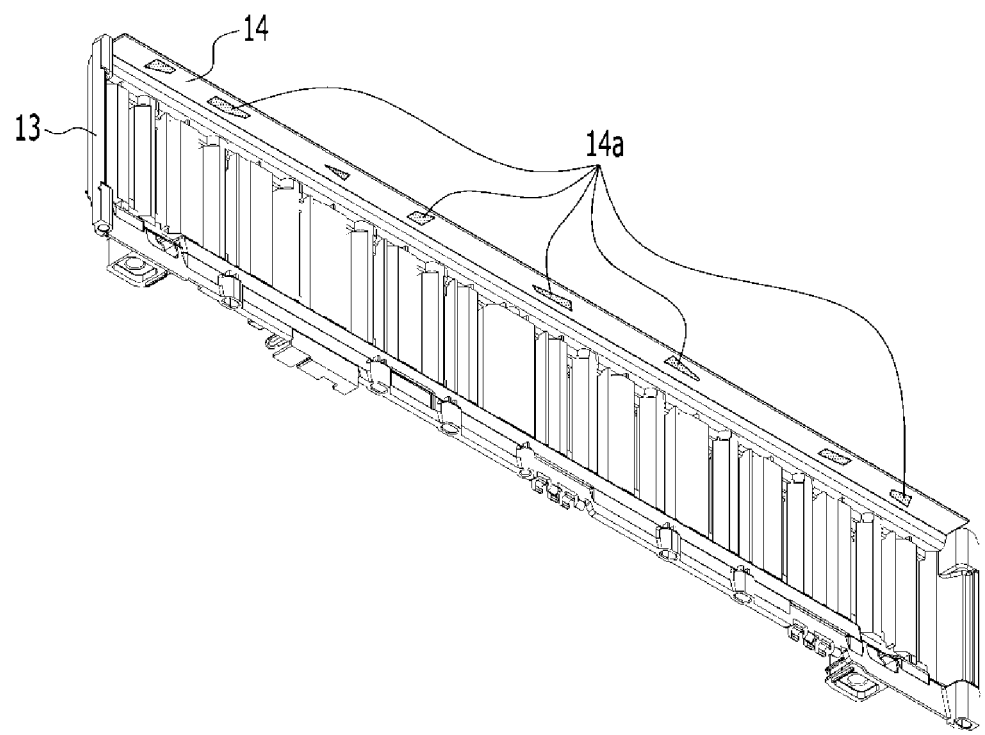
FIG. 4 is a view illustrating a molding defect section in the busbar frame of FIG. 3.

FIG. 3 is a view illustrating a busbar frame in a battery module according to a comparative example. FIG. 4 is a view illustrating a molding defect section in the busbar frame of FIG. 3.

Referring to FIGS. 3 and 4, the busbar frame 13 included in the battery module (not illustrated) has a support part 14 that can surround at least a partial region of bottom surfaces of the front and rear surfaces of the battery cell stack (not illustrated). The support part 14 is extended from the busbar frame 13 in a direction that is perpendicular to the busbar frame 13.

However, in order to mount a busbar frame 13 on the large-area module, the busbar frame 13 also have to be increased in size as it progresses in a horizontal direction of the battery module, and accordingly, the support part 14 of the busbar frame 13 also has to be increased in size. Referring to FIG. 4, when the upsized busbar frame 13 is injection-molded, an unmolded section 14a may be caused in a partial region of the support part 14. Here, the unmolded section 14a means that the partial region of the support part 14 is not subjected to injection molding due to a thin thickness of the support part 14.

In order to prevent the unmolded section 14a of the support part 14 from occurring, when an entire thickness of the support part 14 increases, a total weight of the busbar frame 13 due to the support part 14 increases and thus, a load applied to the frame 200 may increase and damage may be caused due to weight. Further, in this case, because the battery cell stack supported by the support part 14 also becomes far away from a bottom part of the module frame due to the increase in thickness of the support part 14, an application amount of a thermally conductive resin, which is used to form the thermally conductive resin layer between the battery cell stack and the module frame, may also increase. Accordingly, the total weight of the module and thermal resistance increase, heat generation caused from the battery cell stack 120 is not sufficiently discharged to the outside, and the danger of a fire due to heat generation may increase. Further, as the application amount of the thermally conductive resin increases, the manufacturing costs and the manufacturing time may increase.

Thus, in the embodiment of the present disclosure, at the time of forming the upsized busbar frame 130 for being mounted on the large-area module by injection molding, the busbar frame, which is configured to prevent formation of a part such as unmolded section 14*a* of the support part 14 according to the above-mentioned comparative example, will be described.

Figure 5:
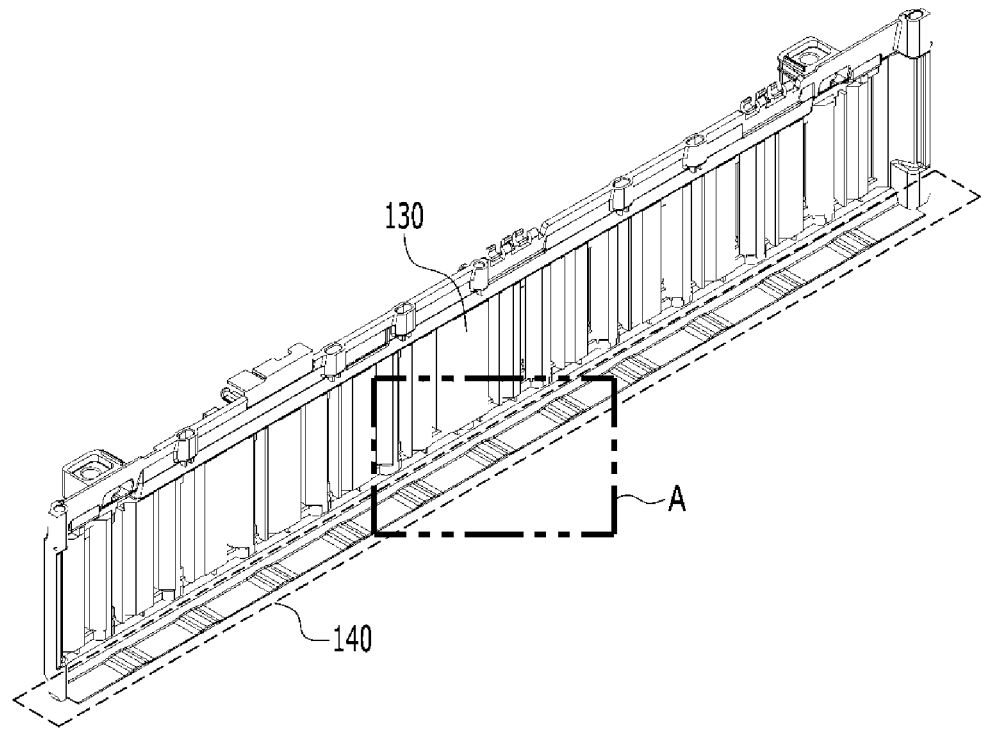
FIG. 5 is a view illustrating a busbar frame in the battery module according to the embodiment of the present disclosure.
Figure 6:
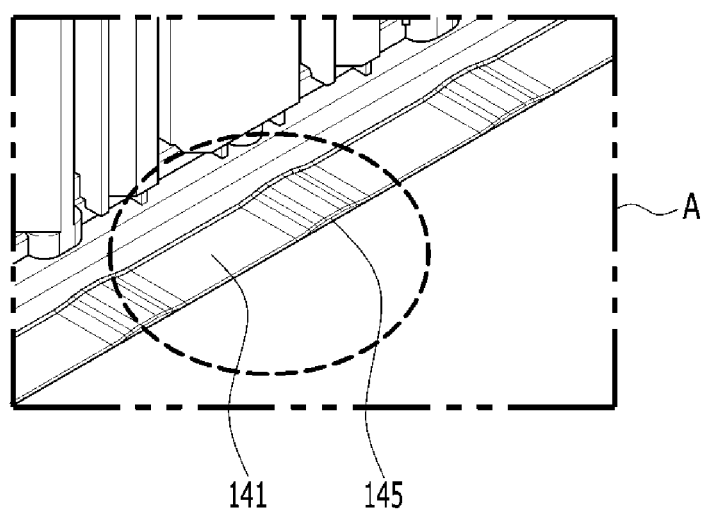
FIG. 6 is an enlarged view of region A of FIG. 5.

FIG. 5 is a view illustrating a busbar frame in the battery module according to the embodiment of the present disclosure. FIG. 6 is an enlarged view of region A of FIG. 5.

Referring to FIGS. 1, 2, 5, and 6, the busbar frame 130 included in the battery module 100 may have the support part 140 that can surround at least a partial region of bottom surfaces of the front and rear surfaces of the battery cell stack 120. In particular, each of the battery cells 110 of the battery cell stack 120 may include a protrusion (not illustrated) that faces the bottom surface of the frame 100, and the support part 140 can surround the protrusions (not illustrated) formed in the battery cells 110. Accordingly, the support part 140 can protect the protrusion (not illustrated) from an external impact and can improve the insulation performances of the battery cells 110.

The support part 140 is extended from the busbar frame 130 in a lengthwise direction of the battery cells. Further, the support part 140 is extended so as to surround the bottom surfaces of the front and rear surfaces of the battery cell stack 120. Further, the support part 140 is extended so as to surround the protrusions (not illustrated) formed in the battery cells 110 of the battery cell stack 120.

The support part 140 may include an extension region 141 and at least two protrusion regions 145 formed on the extension region 141. The extension region 141 may be a region extending from the busbar frame 130 in a direction that is perpendicular to the busbar frame 130. The protrusion regions 145 are regions protruding from the extension region 141 toward the battery cell stack 120. At least two protrusion regions 145 may be spaced apart from each other in a direction in which the battery cells 110 of the battery cell stack 120 are stacked. Here, the protrusions region 145 can perform the role of reinforcing a thickness of the extension region 141.

The support part 140 may be injection-molded, and the extension region 141 and the protrusion regions 145 may also be integrally injection-molded. The support part 140 needs to maintain the thin thickness in order to reduce a load that is applied to the frame 200, reduce the application amount of an insulation substance applied to the frame 200, and have a proper thermal resistance. However, as the busbar frame 130 is injected by further extending in a staking direction of the battery cell stack so as to be mounted on the large-area module, the extension region 141 is also injected by further extending in the stacking direction of the battery cell stack. Accordingly, as the extension region 141 maintains the thin thickness and also extends in the stacking direction of the battery cell stack more than the existing length, the unmolded section 14*a* as shown in FIG. 4 may occur.

Referring to FIGS. 1, and 4 to 6, in order to prevent the unmolded section 14*a* as in FIG. 4 from occurring during injection molding of the support part 140, the protrusion regions 145 may be partially formed in a section in which there is a high possibility of causing the unmolded section 14*a* to occur in the extension region 141. Further, the protrusion regions 145 may be formed at locations corresponding to where the unmolded section would be formed in the extension region 141. Further, in order to prevent the unmolded section 14*a* from occurring in the extension region 141, the protrusion regions 145 may be formed to be spaced apart from each other at a regular interval on the extension region 141.

Accordingly, while the support part 140 included in the upsized busbar frame 140 maintains the thin thickness, the thickness of a partial section of the extension region 141 may be reinforced due to the protrusion region 145. That is, while the support part 140 does not increase the thickness of the extension region 141, a vulnerable portion due to unmolding due to the widened areas may be supplemented by the protrusion region 145. Further, the protrusion region 145 may be integrally molded as the busbar frame 140 is injection-molded, and thus the method for manufacturing may become simpler and the manufacturing time may become shorter.

Figure 7:
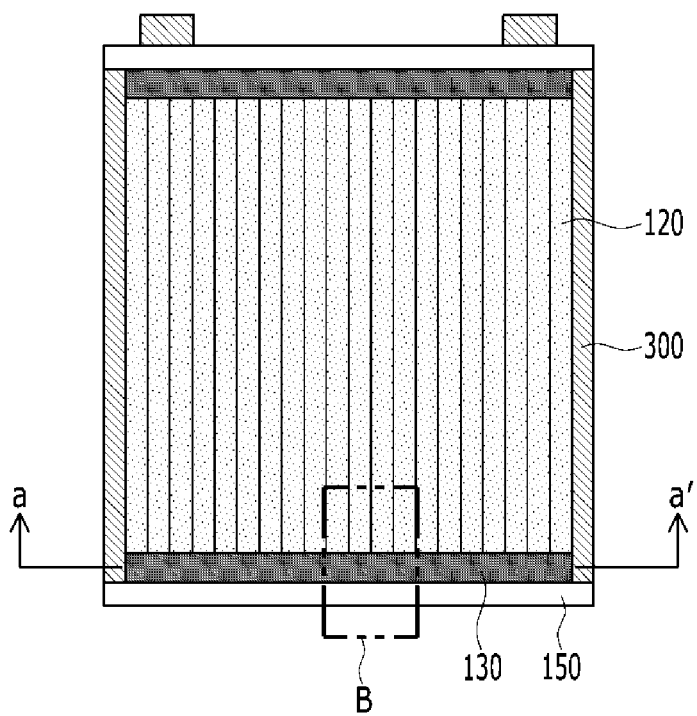
FIG. 7 is a view illustrating a cross-section taken along an xy plane of FIG. 2.
Figure 8:
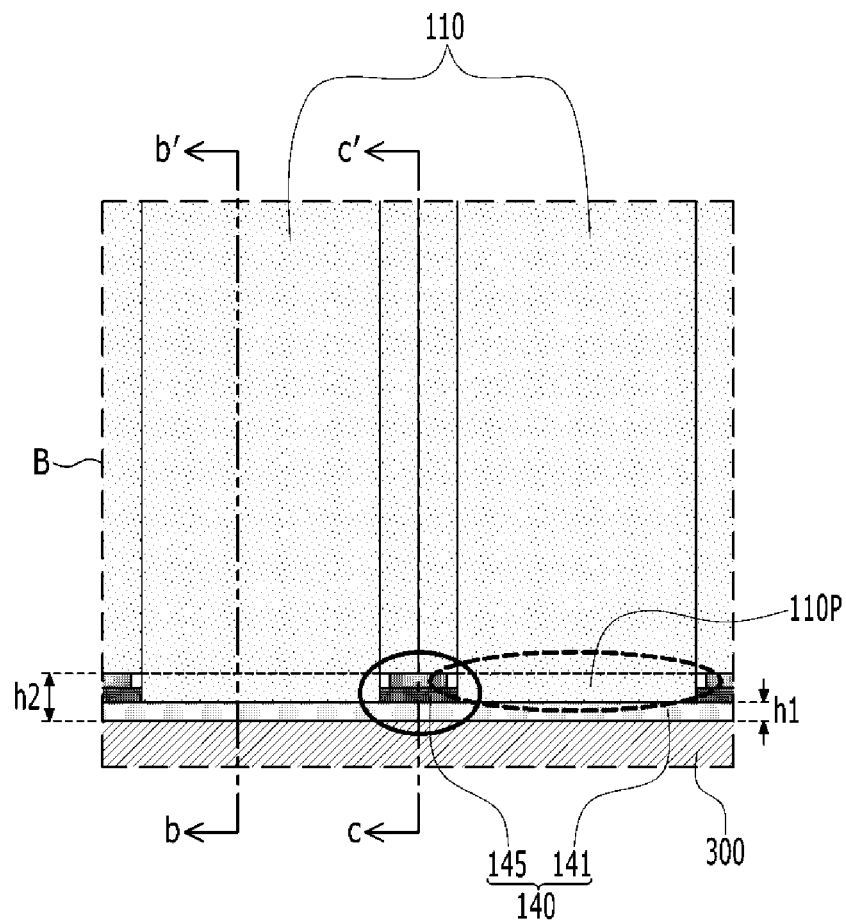
FIG. 8 is a sectional view of region B of FIG. 7, taken along the cutting line a-a'.

FIG. 7 is a view illustrating a cross-section taken along an xy plane of FIG. 2. FIG. 8 is a sectional view of region B of FIG. 7, taken along the cutting line a-a'.

Referring to FIGS. 1, and 5 to 8, the support part 140 may have the extension region 141 and the protrusion region 145, and the protrusion regions 145 may be formed at the location corresponding to a region between at least two battery cells 110. As an example, each of the battery cells 110 of the battery cell stack 120 includes a protrusion 110P. The protrusion regions 145 may be formed at the location corresponding to the region between the protrusions 110P formed at two or more of the battery cells 110, respectively.

Accordingly, the support part 140 forms the protrusion region 145 in order to prevent the unmolded section due to the increase of size, and forms the protrusion region 145 at the location corresponding to the region between the protrusions 110P of the battery cells 110 to thereby minimize an empty space between the support part 140 and the battery cell stack 120. Further, the protrusion region 145 of the support part 140 may also protect side surfaces of the protrusion 110P and thus, protection performance from the external impact about the protrusion 110P of the battery cell 110 can be improved. Further, because an empty space between the support part 140 and the battery cell stack 120 is minimized and thus, the thickness of the thermally conductive resin layer applied to the frame 200 can be maintained similar to the existing thickness thereof, the total weight and thermal resistance may not increase.

Referring to FIGS. 1, and 5 to 8, the protrusion region 145 may have a symmetrical shape. Further, the protrusion region 145 may have a region in which at least one layer is formed to be curved on the extension region 141. Further, the protrusion region 145 may have a region in which at least one layer is formed to be stacked on the extension region 141. In particular, the region formed through stacking may be smoothly connected to the extension region 141. Here, the protrusion region 145 may have a region in which at least one layer having shorter length as compared with the extension region 141 is formed on the extension region 141.

Further, the protrusion region 145 may be formed by stacking at least two layers, the length of at least two layers is smaller as compared with the extension region 141, and the length of a layer adjacent to the extension region 141 may be formed longer. Further, when the protrusion region 145 is formed at the location corresponding to a region between the protrusions 110P, the protrusion region 145 may be identical to or smaller than a region between two battery cells 110.

Accordingly, the protrusion region 145 may be formed in the support part 140 to prevent an unmolded section according to the increase of size, and when the protrusion region 145 is injection-molded, the manufacturing process may become simple and the manufacturing time may become shorter.

Figure 9:
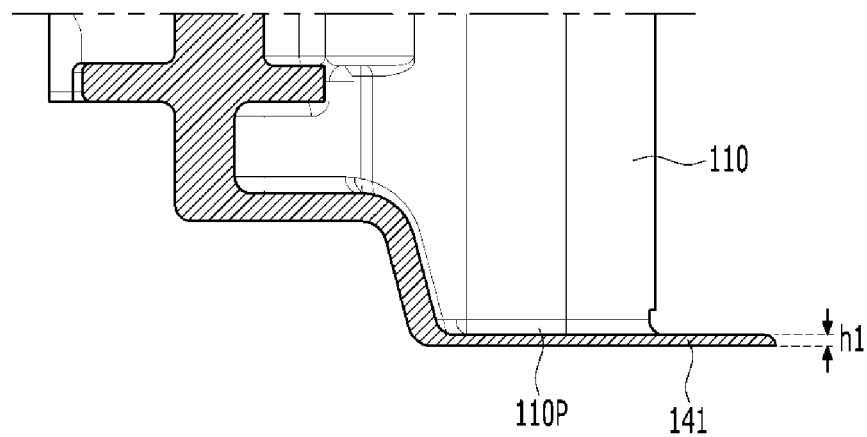
FIG. 9 is a sectional view of region B of FIG. 8, taken along the cutting line b-b'.
Figure 10:
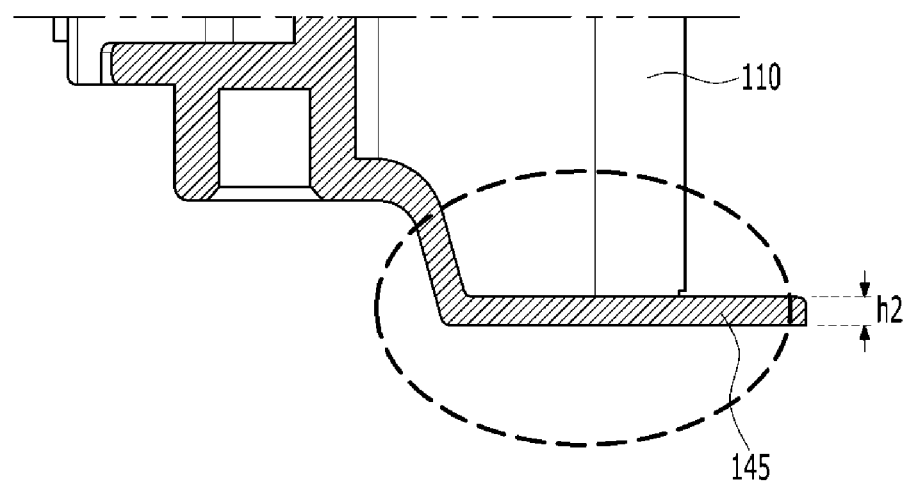
FIG. 10 is a sectional view of region B of FIG. 8, taken along the cutting line c-c'.

FIG. 9 is a sectional view of region B of FIG. 8, taken along the cutting line b-b'. FIG. 10 is a sectional view of region B of FIG. 8, taken along the cutting line c-c'.

Referring to FIGS. 1, and 5 to 10, the support part 140 may be configured such that a thickness h1 of the extension region 141 is smaller as compared with a thickness h2 of the support part at the location in which the protrusion region 145 is formed. This is because the extension region 141 surrounds the protrusion 110P formed at the battery cell 110 of the battery cell stack 120 and thus, must have a thin thickness as compared with the protrusion region 145. Accordingly, the support part 140 corresponds to the extension region 141 and a lower surface of the protrusion 110P, and the protrusion region 145 corresponds to the side surfaces of the protrusion 110P and thus, the protection performance from an external impact about the protrusion 110P of the battery cell 110 can be improved.

Therefore, according to the invention described herein, despite the expansion of the area of the support part 140 due to the size increase of the busbar frame 130, not only the protection and insulation performances of the protrusion 110P of the battery cell 110, which are the existing purposes of the support part 140, can be realized, but also through the protrusion region 145, the unmolded section of the support part 140 can be reinforced, the rigidity can be improved, and the protection of the protrusion 110P can be strengthened.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
110: battery cell
120: battery cell stack
130: busbar frame
140: support part
200: module frame

The invention claimed is:

1. A battery module comprising:
   a battery cell stack in which a plurality of battery cells are stacked; and
   a busbar frame located on a front surface or a rear surface of the battery cell stack,
   wherein the busbar frame comprises a support part surrounding at least a portion of a bottom surface of the battery cell stack,
   wherein the support part comprises an extension region extending a distance from the busbar frame in a lengthwise direction of a battery cell of the plurality of battery cells, and a protrusion region on the extension region, and
   wherein the distance the extension part extends is substantially less than a length of the battery cell stack in the lengthwise direction, and
   wherein a thickness of the extension region is smaller than a thickness of a location of the support part at which the protrusion region is disposed.

2. The battery module according to claim 1,
   wherein the protrusion region comprises at least two protrusion regions, with each protrusion region of the at least two protrusion regions being spaced apart from each other in a direction corresponding to a direction in which the plurality of battery cells are stacked.

3. The battery module according to claim 1,
   wherein the protrusion region is at a location corresponding to where an unmolded section would be formed in the support part.

4. The battery module according to claim 1,
   wherein the protrusion region is at a location corresponding to a region between two of the plurality of battery cells in the battery cell stack.

5. The battery module according to claim 1,
   wherein the protrusion region is protruded from the extension region toward the battery cell stack.

6. The battery module according to claim 5,
   wherein the protrusion region has a symmetrical shape.

7. The battery module according to claim 5,
   wherein at least one layer of the protrusion region is stacked on the extension region.

8. The battery module according to claim 5,
   wherein at least two layers of the protrusion region are stacked on the extension region, with a length of a layer of the at least two layers adjacent to the extension region being longer than lengths of other layers of the at least two layers.

9. The battery module according to claim 8,
   wherein the length of the layer adjacent to the extension region is identical to or smaller than a region between two of the plurality of battery cells in the battery cell stack.

10. A battery pack comprising the battery module according to claim 1.

* * * * *